Patented Feb. 25, 1936

2,031,991

UNITED STATES PATENT OFFICE 2,031,991

METHOD OF RECOVERING PIGMENTS

Otto Ungnade and William F. Richards, Mason, Mich., assignors to S. M. A. Corporation, Cleveland, Ohio, a corporation of Ohio No Drawing. Application January 25, 1934, Serial No. 708,314

3 Claims. (Cl. 260—167)

This invention relates to a method for obtaining readily oxidizable substances from wet materials containing the same with little or no destruction of the desired substances. More particularly, the invention relates to a method for obtaining plant pigments from mixtures which contain considerable water in addition to the pigments.

It is often the case that a raw material or a by-product occurring in an industrial process contains quantities of valuable substances which cannot be extracted in the usual way because the material first requires to be dried and the substance is susceptible to oxidation or to the effects of prolonged heating, with the result that the values in the material are destroyed during the heating operation. As examples of such valuable substances which require careful manipulation for their recovery there may be mentioned the plant pigments, such as carotene, xanthophyll, chlorophyll, lycopin and others, which are readily oxidized and cannot be heated for extended periods in the presence of air, due to the fact that their valuable properties are destroyed by oxidation during heating. On the other hand, these plant pigments cannot be extracted in the wet way since most of the commercially available solvents do not dissolve the pigments in the presence of water, or are miscible with the water.

It has now been found that these pigments and other readily oxidizable or heat-susceptible substances, such as vitamin A found in cod liver and other fish oils, can be separated from the materials containing them without substantial destruction of the desired substances, by removing the water or other vaporizable liquid which is present in the material so quickly that there is not time for extensive oxidation to take place and so as to avoid prolonged heating.

It is, accordingly, an object of the present invention to provide a method of obtaining readily oxidizable substances by quickly drying wet materials containing the same, and then extracting the dried material. Another object of the invention is to provide a method of obtaining plant pigments from materials containing the same in the presence of water, by quickly removing the water before substantial oxidation can occur and then extracting the dried material with a solvent for the pigment substances. Various other objects will in part be obvious and will in part appear hereinafter.

The drying operation may be carried out by means of any of various dryers now used for desiccating materials, such as the Krause dryer described in United States Patent No. 1,506,647. Preferably, the material is spray dried so as to bring the drying medium into contact with droplets of the material and remove the vaporizable liquid, such as water, quickly, by interaction between the drying medium and the extended surface presented by the droplets. In this way, the liquid is rapidly removed and the material reduced to a dry powder before the plant pigments or other oxidizable substances have time to oxidize to any appreciable extent.

The dried material can then be extracted by any one of a number of suitable solvents for the particular substance to be obtained. Thus, in the case of plant pigments, such as carotene, acetone, petroleum ether and other solvents may be used since water is no longer present in sufficient amount to interfere with the solvent action. The extract is subsequently evaporated to remove the solvent, leaving the non-saponifiable matter as a residue. Where petroleum ether is used as the solvent, the evaporation can be carried to completion but where acetone is used, this may, in some instances, contain a small proportion of water derived from the spray-dried soap, the two liquids being miscible, and final separation is effected by stratification. The quantity of water involved is that which it is impossible to remove by commercially practicable methods and is so small that it does not interfere with extraction. However, while it is not dissolved by petroleum ether, it is removed with the non-saponifiable matter by acetone and causes a separation into two layers when the bulk of the acetone has been evaporated off, the pigments remaining in one layer and the acetone and water, in which they are insoluble, going into the other layer which is drawn off, leaving the non-saponifiable matter containing the pigments.

As an example of the application of the process to a particular material, the following is given, although it will be understood that the same is for purposes of illustration and it is not intended to limit the invention thereto:

In the method of refining fats and oils containing pigments, as described in copending application Serial No. 674,777, filed June 7, 1933, an alkali treatment is given to the fat or oil in order to remove free fatty acids. This treatment results in the production of a quantity of soap in addition to the main product retaining the bulk of the pigment, which is removed from the oil and contains considerable water which is present during the saponification. This soap also carries with it a portion of the original pigment content of the oil or fat in the form of carotene, which has heretofore not been recovered. Acetone and other commercially available solvents for carotene will not extract the pigment because acetone and these other solvents do not exert their solvent power for the pigment in the presence of water. On the other hand, the soap cannot be dried by the usual methods because the necessary prolonged heating in the presence of air would result in the partial or total destruction of the pigment which may be extremely susceptible to oxidation. Oxidation may not only destroy the color of the substance but may also destroy its vitamin A potency, where such is present. Obviously, then, ordinary drying cannot be resorted to in order to bring the soap into a condition where it can be extracted by acetone and certain other commercially available solvents, since the desired product would not be present at the end of such drying operation. The use of inert atmospheres in which to conduct the heating is also not feasible, at the present time, due to the cost of maintaining such atmospheres of inert gases, including the expense of purifying the same for return to the dryer, and due to the destructive effect of prolonged heating of the product.

If, however, the wet soap is dried quickly, as by spraying in the above mentioned drying apparatus or other spray drying equipment, it is found that the water can be removed so rapidly that no substantial destruction of pigment by oxidation or heat, or other deleterious action, results. The soap is recovered as a dry powder which contains practically all of the original color. The dry powder can then be extracted by means of acetone, petroleum ether, or other solvent for carotene and the extract evaporated or otherwise treated to place the carotene in an edible solution or to secure carotene crystals.

The soap remaining after the extraction is also a valuable product and, having been bleached by the foregoing extraction, is suitable for conversion into commercial soap.

As is now well known, carotene is the precursor of vitamin A, into which form it is converted in the liver. When cod liver or other fish oils are treated with an alkali to remove free fatty acids it will therefore be understood that the soaps which are formed may contain vitamin A instead of carotene which, for the purposes of this invention, is to be considered equivalent to carotene.

It will be realized that the method is generally applicable in obtaining readily oxidizable substances from raw materials containing them in the presence of various vaporizable liquids, particularly water. The material may be spray dried or otherwise quickly dried to remove the vaporizable liquid so rapidly that there is not sufficient time for any substantial amount of oxidation to take place, even though the necessary heat is applied in the presence of air without the use of inert atmospheres, and the desired substance can then be extracted from the dried material by an appropriate solvent which dissolves the substance in the absence of water.

What I claim is:

1. The method of obtaining carotene from wet soap containing the same which comprises spraying the soap into the form of droplets, drying the droplets before substantial oxidation of the carotene can occur and then extracting the dried soap with a solvent for the carotene.

2. A method of obtaining carotene from wet soaps containing the same which comprises spray-drying the soap before substantial oxidation of the carotene can occur and then extracting the dried soap with acetone.

3. The method of obtaining carotene which comprises treating an oil containing carotene and free fatty acids with a sufficient amount of alkali to saponify the free fatty acids, removing the soap so formed, spray-drying said soap before substantial oxidation of the carotene can occur, and extracting the dried soap with acetone.

OTTO UNGNADE.
WILLIAM F. RICHARDS.